United States Patent [19]

Capps

[11] 4,180,145

[45] Dec. 25, 1979

[54] STATIONARY FORKLIFT AND METHOD OF USE

[76] Inventor: Vidal D. Capps, 1601 S. Ivanhoe, Denver, Colo. 80224

[21] Appl. No.: 924,945

[22] Filed: Jul. 17, 1978

[51] Int. Cl.² ............................................. B66B 11/04
[52] U.S. Cl. ......................................... 187/17; 187/27
[58] Field of Search .................... 187/17, 9 R, 2, 11, 187/20, 27

[56] References Cited

U.S. PATENT DOCUMENTS

| | | | |
|---|---|---|---|
| 2,080,304 | 5/1937 | Cochran | 187/11 |
| 2,709,015 | 5/1955 | Sasgen | 187/9 R |
| 3,757,899 | 9/1973 | Smith | 187/17 |
| 4,049,083 | 9/1977 | Garvey | 187/9 R |

Primary Examiner—Robert R. Song
Attorney, Agent, or Firm—Richard D. Law

[57] ABSTRACT

A stationary frame for a forklift carriage having a simple electric hoist; supports a reciprocable hoist having extending forks. The carriage includes a carriage frame riding in upright rails formed of channels with upper rollers and lower rollers set at about 45° for supporting the forklift in the frame and permitting free reciprocable movement thereof. The unit is useful for stacking and arrangement of pallets, or supporting portions of a palletized stack for retrieving material below the top one of the stack.

6 Claims, 6 Drawing Figures

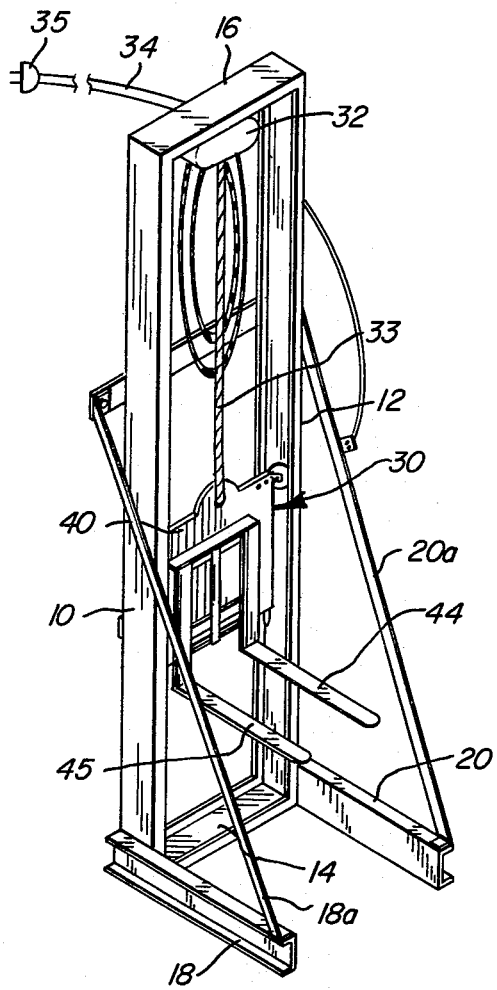
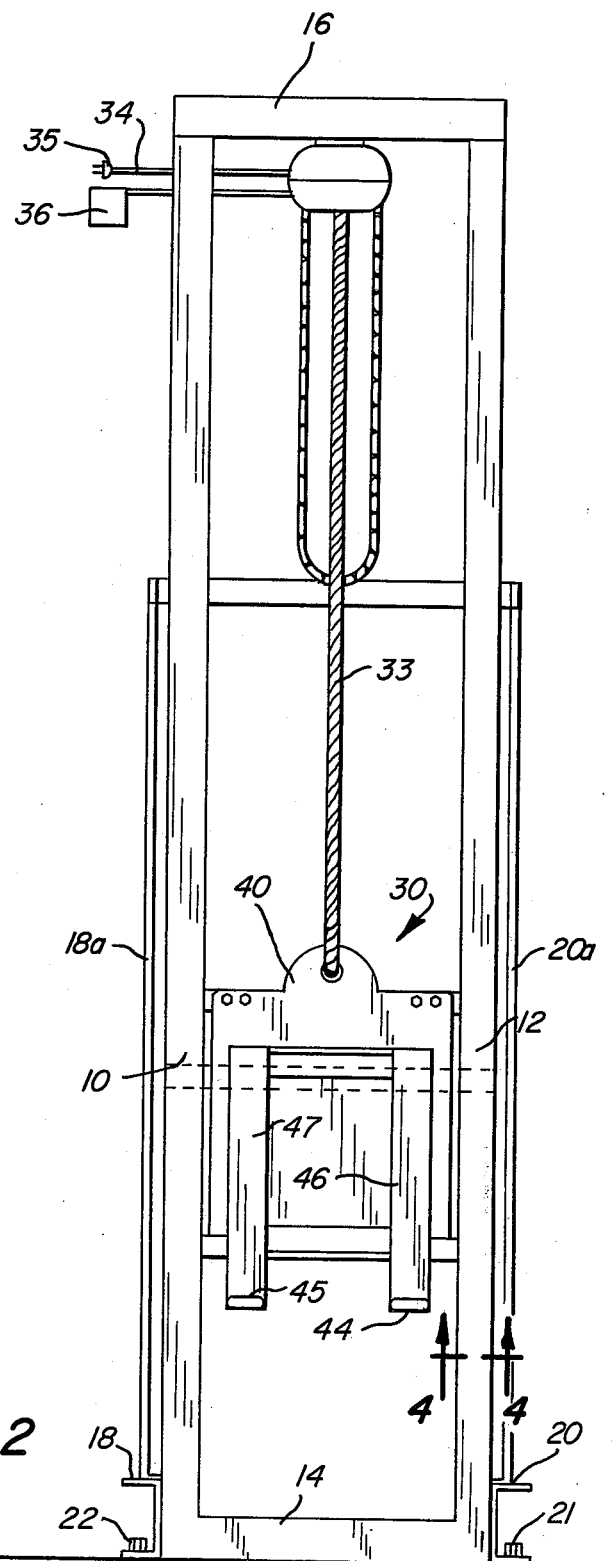
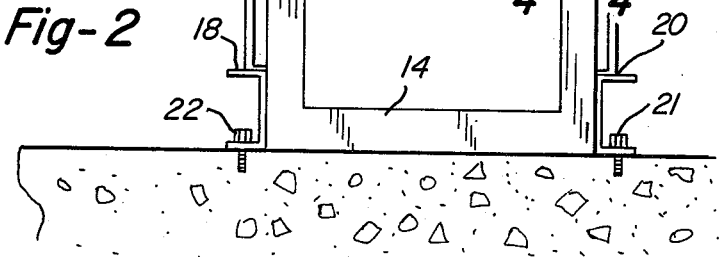

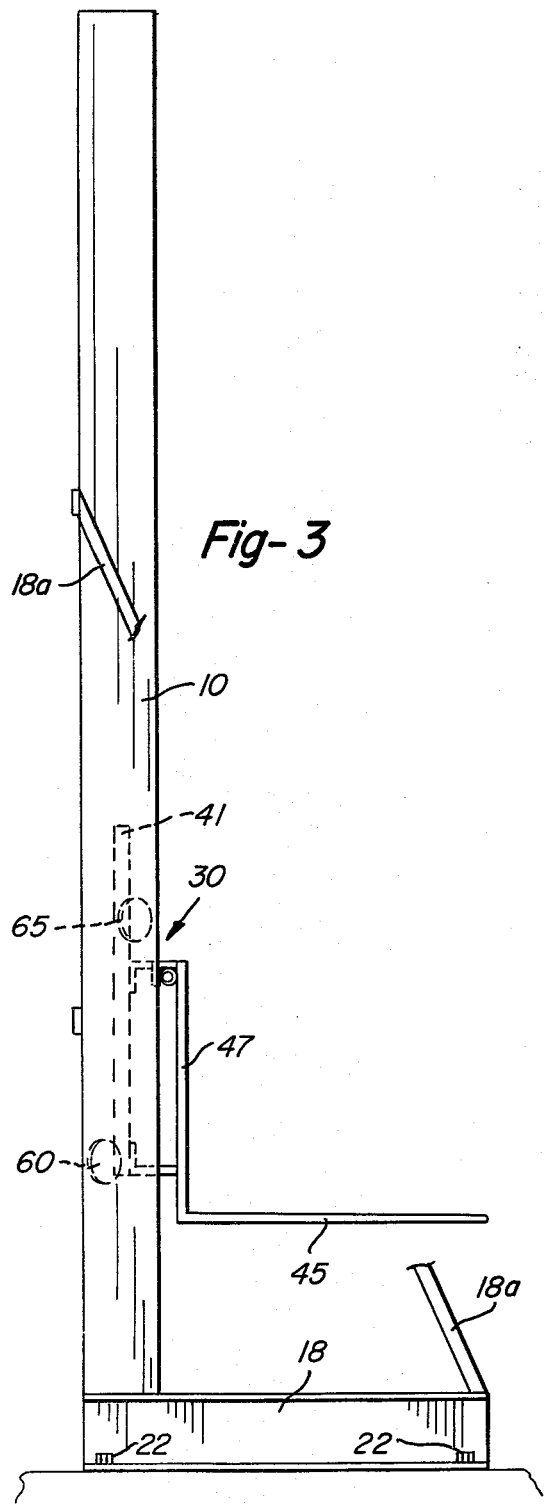
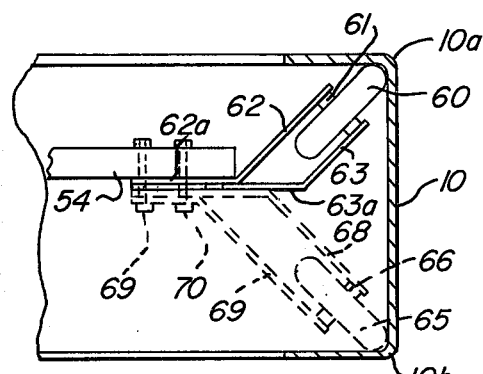
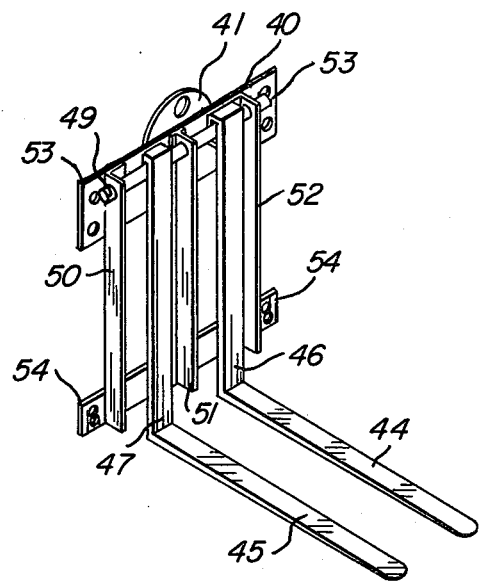

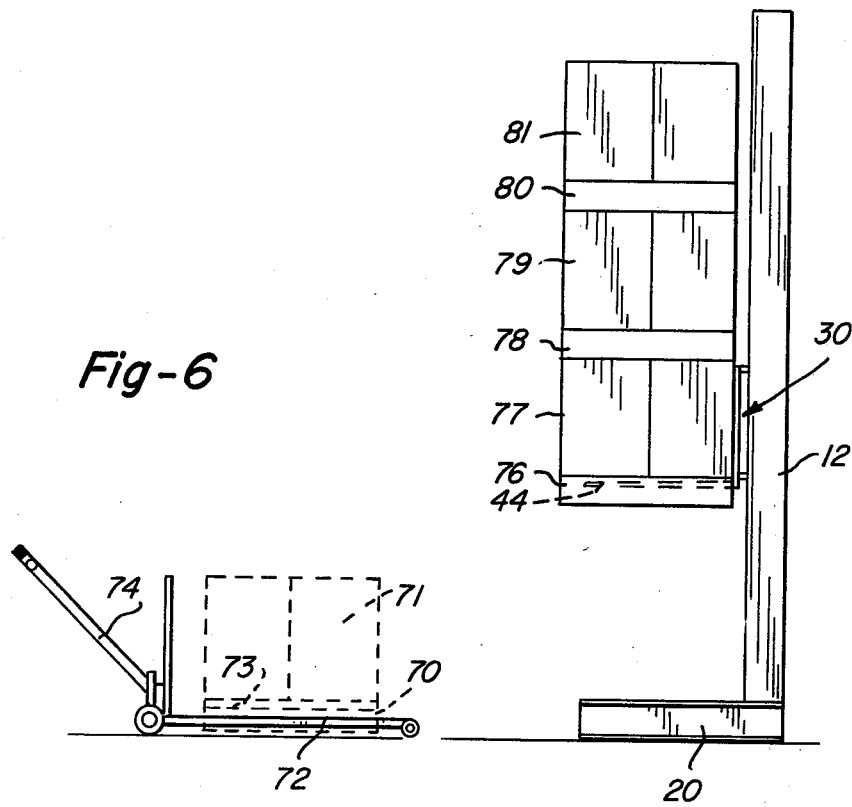

STATIONARY FORKLIFT AND METHOD OF USE

This invention relates to a stationary forklift for palletized loads particularly for a low profile device for low ceiling, crowded storage areas. Specifically, the invention relates to the construction of the vertical rails and carriage assembly of a stationary forklift.

In many business operations, a large volume of goods are moved. This requires a storage area as an intermediate holding of the material. A convenient way to handle and store materials is by pallets, which may be picked up, transported and let down by a mobile forklift. However, many such businesses have housing facilities which do not permit the use of high lift handling devices, such as a motorized high lift forklift. Such businesses still need a forklift, since most of the goods are delivered in large trucks, and palletized material is handled by forklifts. For the general handling of materials of small and medium size businesses, a low lift forklift has been found satisfactory. Such low lift forklifts are called mules, pallet jacks or the like. These are wheeled, low profile units, some powered and some unpowered. These mules or pallet jacks have a low lift capacity of only a few inches.

Some of the advantages and needs for mules or pallet jacks are the low ceiling and/or standard height doors for the building, small and crowded storage rooms, and limited maneuvering space in the building. Also, a motorized high lift forklift (or a lift truck) costs thousands of dollars, requires battery care facilities and mechanical repair facilities as they are complex machines. They are motorized and require substantial room for operation. A mule or pallet jack may be a simple hand lever jack with three unpowered wheels, which costs but a few hundred dollars. These are small and can be maneuvered in small spaces. In addition, many businesses, e.g. department stores, some warehouses, etc. simply are too small and have too low a volume of material to justify a motorized lift.

Therefore, large numbers of businesses using palletized goods do not have motorized lifts, but use pallet jacks or mules. This creates a considerable problem in handling goods stacked in multiple layers on pallets, including problems of storage of goods from delivery trucks, retrieving goods from stacks and rearranging the palletized goods. For example, on delivery of palletized goods, it is desirable to place the containers of the new goods on the bottom of a stack, but this cannot be accomplished with a pallet jack. Also, goods in a stack may be required, and when the desired containers are not in the top layer of a stack, the stack must be unlayered, the goods retrieved and the stack relayered.

OBJECTS AND ADVANTAGES OF THE INVENTION

It is, therefore, included among the objects and advantages of the invention to provide an inexpensive palletized goods handling system, useful for low ceiling buildings, and small crowded storage areas.

Another object of the invention is to provide a palletized goods handling system with low lift forklifts and an inexpensive forklift having substantial height capabilities.

Still another object of the invention is to provide a novel construction of a carriage of a stationary forklift device for handling palletized goods.

Yet another object of the invention is to provide a simple, easily operated stationary forklift for handling palletized goods.

These and other objects and advantages of the invention may be ascertained by reference to the following description and illustrations.

GENERAL DESCRIPTION OF THE DRAWINGS

FIG. 1 is a perspective view of a lift device according to the invention;

FIG. 2 is a front elevational view of the device of FIG. 1 in larger detail and showing floor attachment.

FIG. 3 is a side elevational view of the lift of the invention;

FIG. 4 is a bottom view of the support roller system of the left of the invention, showing the upper roller in phantom for clarity;

FIG. 5 is a detail perspective view of the fork portion of the carriage of the lift of the invention;

FIG. 6 is a generally schematic view of the use of a lift according to the invention with a floor mule showing how access to various pallet loads is achieved.

SPECIFIC DESCRIPTION OF THE DRAWINGS

In general, the unit of the invention is a stationary, inexpensive pallet lift, using an electric winch or a hand powered block and tackle chain lift or the like. The unit is arranged with a forklift mounted in a simple channel frame, which is usually of a low height and arranged to be accomodated in buildings having low ceilings.

In the device illustrated, a pair of upright channels 10 and 12 are secured together by a bottom support channel 14 and a top channel support 16. Floor braces 18 and 20 provide means for supporting the uprights and, also, provides means of securing the same to a floor, by means of anchor bolts 21 and 22, FIG. 2. Angle braces 18a and 20a provide support for the uprights under heavy loads. A carriage, shown generally by numeral 30, rides in the side upright channels, and is raised and lowered by an electric hoist or winch 32. This hoist has a hoist line 33 and a power cable 34 for connection to a source of power, as by plug 35. A remote control switch box 36, on a cable, which may be on on of the braces 18a and 20a for accessibility, is in position for operation by an operator to provide control of the hoist. As stated, the illustrated model uses an electric hoist, but a hand operated block and tackle chain hoist or the like, of conventional design, may be effectively used for installations where use of the unit is limited.

The carriage 30 includes a frame 40 with a haul line support plate 41 and upright supports for extending fork tines 44 and 45. The fork tines are mounted on uprights, respectively, 46 and 47, which are pivotally mounted on bar 49. The bar 49 is mounted on the frame in a manner to permit lateral movement of the tine supports 46 and 47, providing width adjustment of the tines to fit various configurations of pallets. The frame may be arranged to permit the tines to rest on the floor in down position, when desired. The frame includes vertical support members 50, 51 and 52 secured to the haul line support plate 41, cross-members 53 and 54. The cross-members 53 and 54 are upper and lower supports for rollers riding in the channels.

The rollers for carriage frame are set at 45° to plane of the carriage frame, with upper rollers arranged in the angle or corner of the forward part of the side channels, and the lower rollers are arranged in the angle or corner of the rear portion of the channels. This arrangement permits the upper rollers to take the forward and downward movement (pivotal movement) produced by a load on the tines, and the lower rollers to take the movement of the load in a rear and upward direction. The carriage has two upper and two lower rollers for the load movement, and, also, providing lateral stability of the carriage and stabilizing the carriage under torque, as by laterally unbalanced pallets. The lower roller 60, FIG. 4, is mounted on an axle 61 for rotation. The axle is secured in mounts 62 and 63 set at a 45° angle to laterals 62a and 63a which are bolted to the bottom frame lateral 54. The laterals 62a and 63a include elongated bolt holes (not shown) permitting adjustment of the roller toward and away from the angle 10, for securing the roller snugly in the angle 10a of the channel. In a like manner, upper roller 65 is mounted on axle 66 which is mounted in supports 67 and 68, secured by bolts 69 and 70 to the upper lateral 53. The supports include lands which lie in the plane of the carriage at 45° to the roller, placing the roller in angle 10b. The upper rollers are, likewise, adjustable to insure a tight fit with free running of the rollers in the channels, controlling the side away or twisting.

The tines 44 and 45 are wedge shaped blades, with a thin forward end for easily fitting the opening of the pallets. Some pallets are of a single material thickness, as in polyethylene pallets, and the tines are arranged to slide under the single thickness. In other more common pallets, two layers of boards are held apart by end and middle braces, leaving openings into which tines may extend.

In using the device of the invention, FIG. 6, for example, the lift is secured in a location in a warehouse area of a store or the like. Supplies in boxes, cartons or similar containers are generally stacked in one or two or more layers on a pallet. A number of pallets, each with a load, may be vertically stacked for conserving space. The illustration shows a single layer of cartons on the pallets, with a number of pallets in the stack. Thus, pallet 70, which was the bottom pallet, has a single layer of cartons 71 on it. This pallet is being held by a pallet jack 72, which in this case, is a wheeled frame having a low lift fork tine 73 mounted on the pallet jack and raised or lowered by a lever 74. The pallet jack usually has tines which raise to only a few inches, some 2–5 inches, and this particular type is manually raised and manually pushed or pulled about. Previously, the total stack included a second layer including pallet 76 with a single layer 77 on it, a third layer including pallet 78 with a single layer 79, and a fourth layer including pallet 80 with a single layer or cartons 81 on it. Smaller stores may order one or more cartons each of a plurality of different items, and to save space, these are stacked with other goods. For example, the lower or first layer 71 contains several cartons of goods which are needed before any of the goods in the upper layers. The upper layers 77, 79 and 81 contain cartons of other goods which must be removed from the lower layer. To retrieve the goods of the lower layer, the entire stack is lifted by the floor jack from its storage position and moved to the lift of the invention. The carriage 30 is raised to a height to engage the pallet 76, and the stack is moved against the lift. When the stack is in position against the carriage, the forks of the lift are raised, raising the upper pallets above the lower desired layer 71 which is now available. The remainder of the stack may now be replaced on the pallet jack (emptied of its load of the lower layer) by lowering the lift and then moving the pallet jack to engage pallet 76. The stack may then be replaced in its storage area. Of course, other layers of the stack may be retrieved by moving the lift forks to the height desired to engage the pallet resting on top of the layer desired. For example, the containers of layer 77 may be retrieved by placing the lift tines to a height to engage pallet 78. The two upper layers are hoisted by the lift to make the layer 77 available. When layer 77 is removed along with pallet 76, the two upper layers 79 and 81 on their pallets may be restacked on layer 71 and returned to the storage area.

What is claimed is:

1. A stationary forklift device comprising:
   (a) frame means including a pair of inwardly facing upright channels for supporting the running gear of a carriage, and lateral brace means mounted on the bottom of said channels against a load carried by a carriage;
   (b) a carriage mounted in said inwardly facing channels, having extending lift fork tines over said brace means;
   (c) running gear for said carriage including upper rollers secured to an upper portion of said carriage at about 45° directed into the forward corners of said upright channels and lower rollers secured to a lower portion of said carriage at about 45° directed into the rear corners of said upright channels, said rollers combining to counteract against movement of said carriage under a load on said lift forks and torque of a laterally uneven load; and,
   (d) means for raising and lowering said carriage.

2. A stationary forklift device according to claim 1, wherein said extending lift forks are laterally adjustable.

3. A stationary forklift device according to claim 1, wherein said lift forks include a vertical support member for each extending tine, and said vertical support member is laterally adjustably secured at its top to said carriage.

4. A stationary forklift device according to claim 1, wherein said brace means includes extending members secured to said upright channels, arranged for resting on and securing to a floor, and angle braces between said extending members and said upright channels.

5. A stationary forklift device according to claim 1, wherein said rollers are adjustably mounted for providing a snug fit of the rollers in the corners.

6. A stationary forklift device according to claim 1, wherein said means for raising and lowering said carriage is an electric hoist, with a hual line secured to said carriage.

* * * * *